United States Patent [19]

Miller

[11] Patent Number: 4,799,849

[45] Date of Patent: Jan. 24, 1989

[54] AUTOMOBILE TRUNK LOADING AND UNLOADING DEVICE

[76] Inventor: Donald L. Miller, 307 Steuben St., Horseheads, N.Y. 14845

[21] Appl. No.: 114,716

[22] Filed: Oct. 30, 1987

[51] Int. Cl.$^4$ ............................................. B60R 5/04
[52] U.S. Cl. ............................. 414/462; 224/42.44; 296/37.1; 414/522
[58] Field of Search ............... 414/462, 463, 466, 522, 414/540, 595; 224/42.44; 296/37.1, 37.2

[56] References Cited

U.S. PATENT DOCUMENTS

| | | | |
|---|---|---|---|
| 256,363 | 4/1882 | Nourse. | |
| 2,014,019 | 9/1935 | Girl | 414/462 |
| 2,091,070 | 8/1937 | Girl | 414/462 |
| 2,094,401 | 9/1937 | Girl | 414/462 |
| 2,890,908 | 6/1959 | McLean et al. | 296/37.1 |
| 2,921,700 | 1/1960 | Reed, Jr. | 414/545 |
| 2,953,287 | 9/1960 | Werner | 224/42.44 |
| 3,011,669 | 12/1961 | Sylvester | 414/462 |
| 3,365,084 | 1/1968 | Fernicola | 224/42.21 X |
| 3,559,829 | 2/1971 | Shamel | 414/466 |
| 3,627,158 | 12/1971 | Kobasic | 414/462 |
| 4,073,395 | 2/1978 | Clement | 414/462 |
| 4,251,178 | 2/1981 | Bourgraf et al. | 414/462 |
| 4,455,948 | 6/1984 | Torres | 224/42.44 X |
| 4,573,854 | 3/1986 | McFarland | 414/462 |
| 4,604,022 | 8/1986 | Bourgraf | 414/462 X |

FOREIGN PATENT DOCUMENTS

| | | | |
|---|---|---|---|
| 551495 | 1/1958 | Canada | 296/37.1 |
| 1124354 | 6/1956 | France | 414/595 |

Primary Examiner—Leslie J. Paperner
Attorney, Agent, or Firm—Remy J. Van Ophem

[57] ABSTRACT

A motorized lifting device for loading and unloading articles from automobile trunks has a floor frame acting as a base for a pair of upstanding platform supports each of which has a flange. A carriage having a plurality of rollers is reciprocally mounted on each upstanding platform support such that at least two spaced apart rollers are on one side of the flange and at least one roller is on the other side of the flange. The flange, therefore, acts as a guide for the carriages when moving along the upstanding platform support. A platform frame is attached to the carriages and a platform rests on the platform frame. Lifting is achieved through means of a cable attached to each carriage, strung over a pulley on each upstanding platform support that is then wound onto a spool rod mounted to the upstanding platform supports. The spool rod is rotated by means of an electric motor powered by electricity from the automobile. In one alternative embodiment, the platform is slidably mounted on the platform frame; in another alternative embodiment, the floor frame, the platform frame, and the platform are size adjustable for accommodating variously sized automobile trunks.

17 Claims, 2 Drawing Sheets

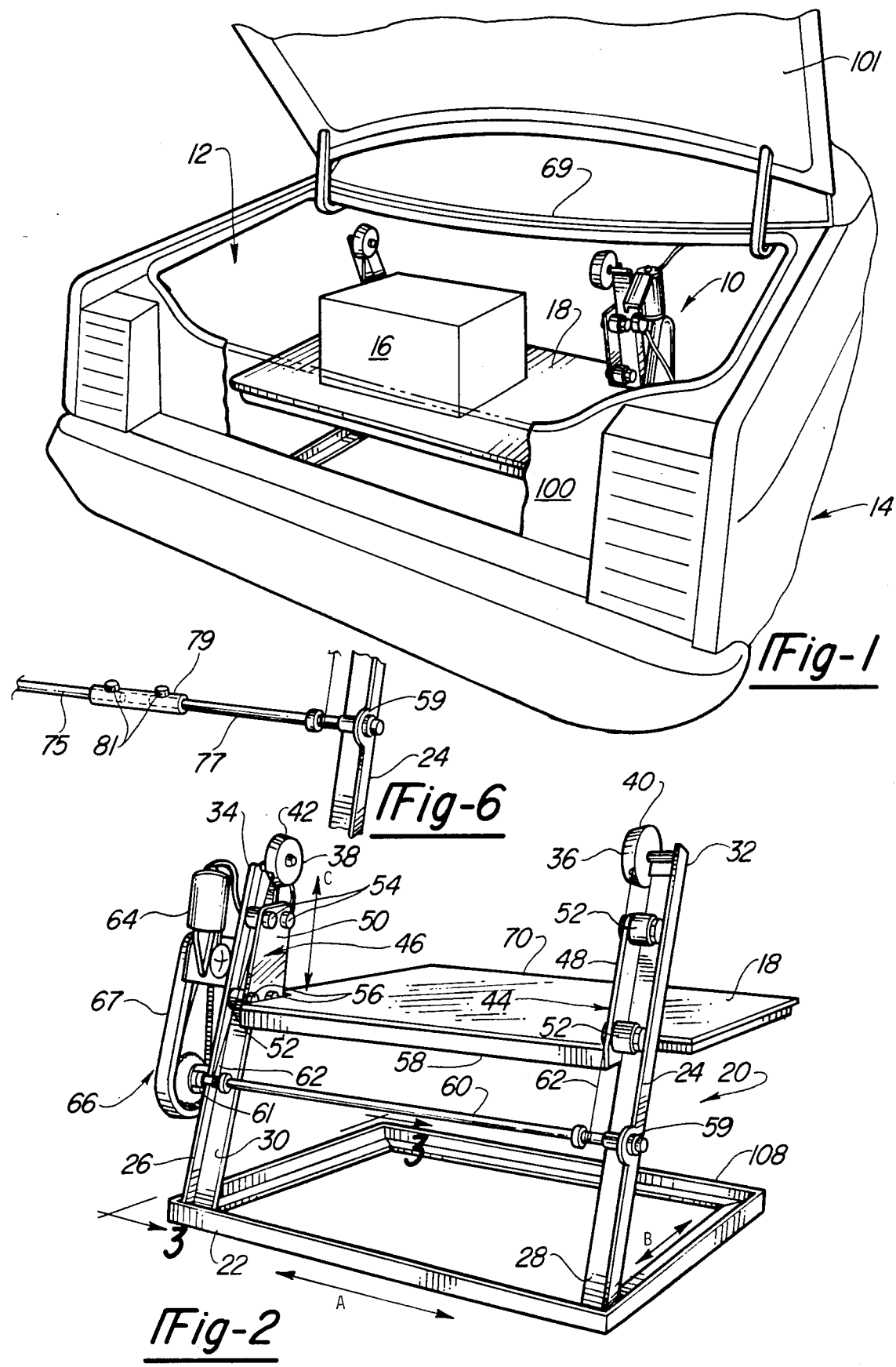

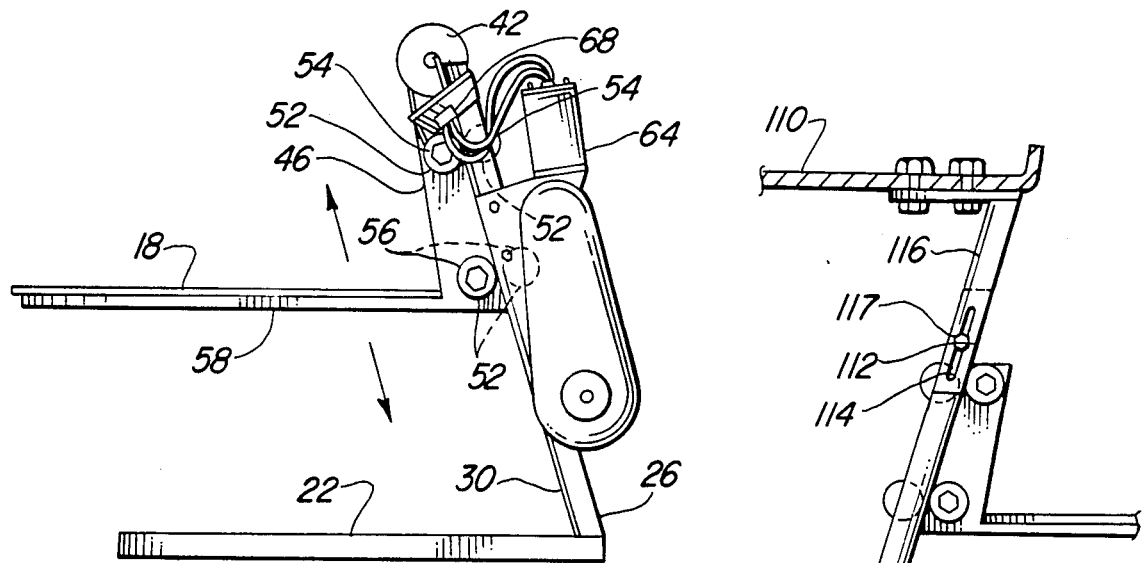
Fig-3
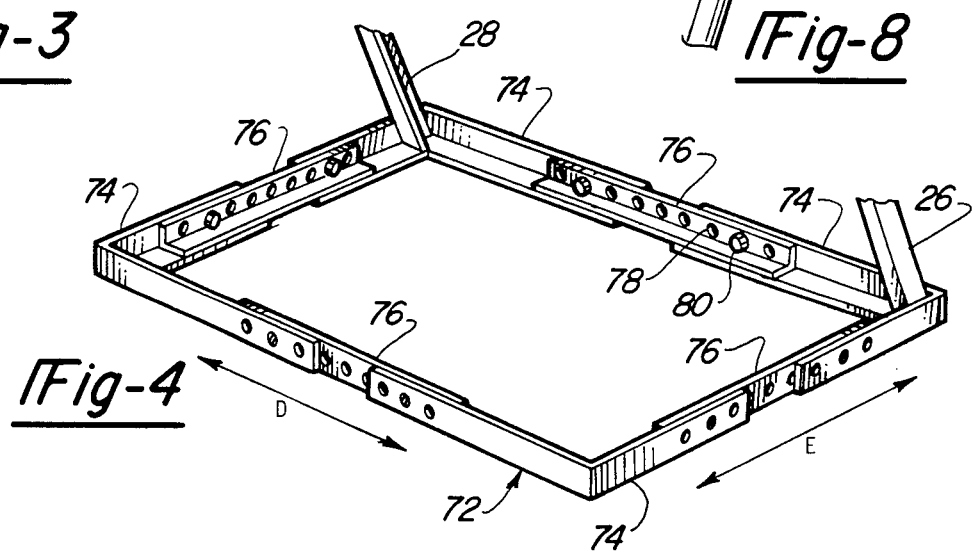
Fig-8
Fig-4
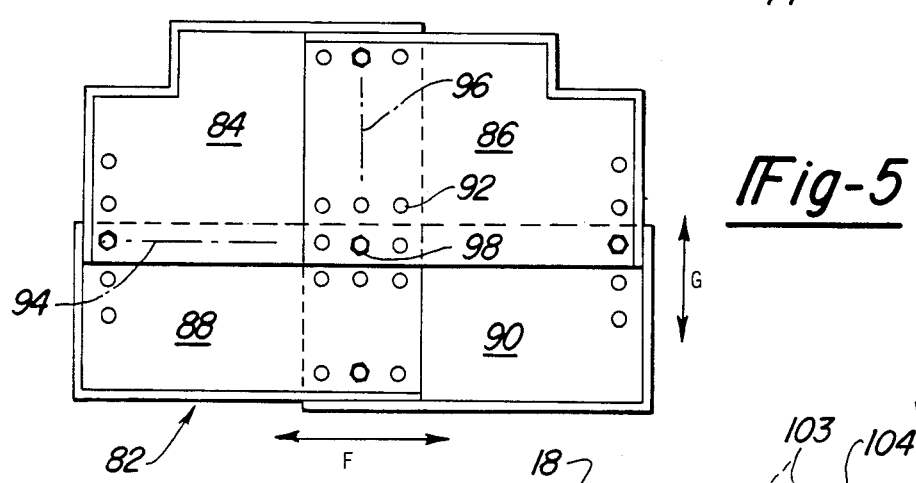
Fig-5
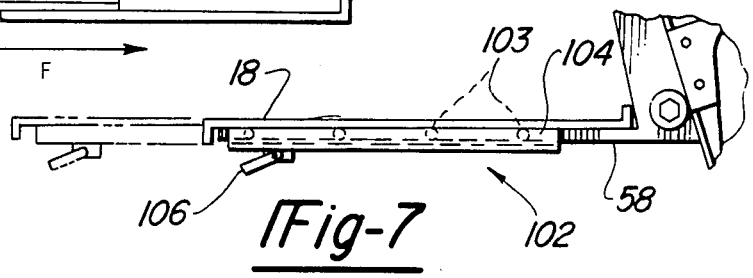
Fig-7

AUTOMOBILE TRUNK LOADING AND UNLOADING DEVICE

BACKGROUND OF THE INVENTION

1. Field of the Invention

This invention relates to lifting devices, particularly package lifting devices for automobile trunks.

2. Description of the Prior Art

Automobile trunks are intended for the storage of articles out of the way of passengers and are generally structured to have sidewalls integral with the car body, a rear wall, and a trunk lid which meets with the sidewalls and rear wall for sealingly covering the trunk space. Commonly, articles which are transported in the trunk are heavy and unwieldy, making it difficult to unload the article from the trunk. Also today's automobiles quite often have rear walls that extend well above the trunk floor, causing the driver significant difficulty in that the article must be lifted up over the rear wall both when putting articles into the trunk and when taking them out. This problem is especially aggravated when the articles must be handled by someone who has an injured or weak back, or someone who for reasons of health or age cannot easily lift articles into and out of the trunk.

One proposal to solve this problem is described in U.S. Pat. No. 2,953,287 Werner. Werner teaches a retractable package carrier for an automobile trunk having a basket for supporting articles that is swingable from a position where it rests on the trunk floor to a position upward and rearward near the rear wall of the trunk. A pair of parallel tubes act as guides for reciprocal movement of the basket beyond the rear wall. This solution, which was directed to car designs in 1960, is not readily adaptable to today's car designs which incorporate relatively high rear walls. Because of the greater rear wall height in today's cars and the fact that the basket must achieve this height by swinging, there is a considerable wasted trunk space associated with the significant distance of front to rear movement of the basket during the swing.

A second proposal to solve this problem is described in U.S. Pat. No. 4,455,948 to Torres. Torres teaches a platform which is attached to a pair of lazy tongs, each having six mutually articulated bar shaped members. The platform rests on the automobile trunk floor with the lazy tongs folded and then raised upward and rearward by extending action of the lazy tongs. It is questionable whether this device can adequately lift an article above the trunk rear wall of today's cars. Additionally, the relatively large amount of trunk space taken up by the lazy tongs when fully folded, coupled with their requirement for a rearward clearance as they are extended, make this solution inefficient in terms of trunk space utilization.

Both of the above cited references offer solutions which take up otherwise usable trunk space, require the user to lift the device manually, and are not structured to accommodate articles of considerable weight, such as bags of cement, which are often transported in automobile trunks.

Hence, there remains a problem in the art to devise a trunk lift mechanism which takes up very little usable trunk space, is motorized using the car's electrical power, and is sturdy enough to lift any article which may be placeable within the trunk.

SUMMARY OF THE INVENTION

The present invention provides an automobile trunk lift device for loading and unloading car trunks safely and easily, which is removable, motorized, sturdy and is structured to effectively fit into a trunk, thereby ensuring reliable, stable operation with a minimum of wasted trunk space.

The preferred embodiment of the invention uses a rigid support structure having a generally rectangular floor frame dimensioned to rest on the floor of a standard car trunk from which two upstanding platform supports are attached. A pair of carriages, each structured to be rollingly mounted on a flange attached to each of the upstanding platform supports, are connected to a platform frame, which in turn supports a platform. A spool rod is provided which is rotatably mounted to the upstanding platform supports. A pulley is mounted at the upper ends of each of the upstanding platform supports and on each upstanding platform support a cable is strung from the carriage, over the pulley and finally wound onto the spool rod. An electrical motor is provided to rotate the spool rod, causing the cable to be wound thereon, thereby lifting the carriages, and the attached platform, along the upstanding platform supports. To lower the platform, the motor rotational direction is simply reversed.

In one alternative embodiment of the invention, provision is made for reciprocal movement of the platform horizontally over the rear wall of the trunk; in another alternative embodiment, provision is made for accommodation of the invention to various size trunks found in today's automobiles.

Accordingly, it is an object of the invention to provide a reliable, safe and effective automobile trunk loading and unloading device.

It is also an object of the invention to provide a trunk loading and unloading device which is motorized and sturdy enough to lift the full range of articles normally transported in automobile trunks.

It is yet a further object of the invention to provide an automobile trunk loading and unloading device which takes up a minimum of trunk space, is fully removable, and is very easy to use.

It is still a further object of the invention to provide an automobile trunk loading and unloading device which can accommodate various sized trunks and has provisions for reciprocal horizontal movement of the platform over the trunk rear wall.

These and other objects, advantages, features, and benefits of the invention will become apparent from the following specification.

BRIEF DESCRIPTION OF THE DRAWINGS

FIG. 1 is a perspective view showing the invention being used in an automobile trunk;

FIG. 2 is a perspective view showing the invention from the rear;

FIG. 3 is a side view of the invention shown along lines 3—3 in FIG. 2;

FIG. 4 is a perspective view of a size adjustable floor frame according to the invention;

FIG. 5 is a plan view of the size adjustable platform according to the invention;

FIG. 6 is a perspective detailed view showing a sleeve coupler for a size adjustable spool rod according to the invention;

FIG. 7 is side view of a horizontally reciprocable platform according to the invention; and FIG. 8 is a side view of an anti-tipping structure according to the invention.

DETAILED DESCRIPTION OF THE PREFERRED EMBODIMENT

Referring now to the figures, FIG. 1 shows the loading and unloading device of the present invention 10 being used in the trunk 12 of an automobile 14. As may be seen from the figure, an article 16 is located upon a platform 18 of the invention. The platform 18 may be covered with a soft frictional surface, such as carpeting, as an aid in retaining the article on the platform during driving of the automobile; a lip (not shown) around the edges of the platform may serve this purpose as well.

FIG. 2 shows the invention from the rear, that is, from the side facing the passenger compartment in FIG. 1. From the figure, it will be observed that a rigid support structure 20 is used to reciprocally guide carriages 44 and 46 which in turn support the platform 18. This is particularly understood as follows.

A generally rectangular floor frame 22 is used as a base for the invention. The floor frame 22 is of sufficient length A and width B so as to ensure stable operation of the invention during raising and lowering of foreseeably heavy articles placed upon the platform 18 without the invention tipping. However, the maximum size is limited because it is preferred that the floor frame rest on the trunk floor, the dimensions of which set the maximum for floor frame length and width. A pair of platform supports 24 and 26 are upwardly attached to the frame by conventional attachment means, such as welding. A flange 28 and 30 is attached, respectively, to each of the upstanding platform supports 24 and 26. The flanges are provided preferably by selecting an L-shaped cross-section for the upstanding platform supports 24 and 26. A suitable example of such a structure is common angle iron. Attached to an upper end 32 and 34 of each of the upstanding platform supports is a pulley 36 and 38. In FIG. 2, these are shown covered by a protective safety guard 40 and 42 to protect the user and keep debris clear from the pulleys.

The carriages 44 and 46 are provided for each of the upstanding platform supports 24 and 26 and are reciprocally moveable along the respective flanges 28 and 30. As can be seen from FIGS. 2 and 3, each carriage is constructed of a plate 48 and 50 having attached thereto four rollers 52. Generally, the rollers 52 are arranged in a rectilinear pattern, with one roller each at the corners of the rectilinear pattern. Thus, two rollers 52 are arranged on each side of the respective flange. The reason for this can be understood by referring to the left side carriage 46 in FIGS. 2 and 3. It will be seen that because the rollers 52 engage both sides of the flange 30 the carriage is guided along the flange. Further, because two sets of rollers are provided, an upper set of rollers 54 and a lower set of rollers 56, the carriage 46 is guided in fixed orientation relative to the flange 30. Each of the carriages are attached to a platform frame 58 by conventional attachment means, such as welding or bolting, which ensures a fixed horizontal orientation for the platform frame, as well as a fixed orientation between the carriages and the platform frame. The platform 18, is, in turn, attached atop of the platform frame 58.

The fixed orientation of the carriages and platform frame are required to ensure a horizontal platform surface on which to place articles when using the invention. Particularly, a horizontal orientation of the platform 18 is ensured because the spaced apart relationship between the upper set of rollers 54 and the lower set of rollers 56 form a lever arm which generates a torque countering the torque generated by the weight of the article over a lever arm defined by the distance between the location of the article and the upstanding platform supports.

The lifting function of the invention is accomplished as follows. A spool rod 60 is rotatably attached at either end of the platform supports 24 and 26, by means of projections 59 and 61 which allow for clearance between the spool rod 60 and the carriages 44 and 46. A cable 62 is strung from each carriage 44 and 46, over the respective pulley 36 and 38 and then wound onto the spool rod. An electric motor 64 attached to one of the upstanding platform supports runs on electrical energy supplied by the automobile and is controlled by a dual throw switch 68. A chain drive 66 transfers rotation from the electric motor 64 to the spool rod 60. The preferred drive system shown in FIG. 2 is a conventional chain and sprocket drive covered by a safety guard 67. Accordingly, as the electric motor causes the spool rod to rotate, the cable will wind thereon, causing the carriages, and their attached platform frame and platform, to move upwardly along the upstanding platform supports. Reversal of the electric motor rotation direction will unwind the cable, allowing the platform to move downwardly along the upstanding platform supports.

FIG. 3 shows the direction of motion of the platform reciprocably along the upstanding platform supports 24 and 26. The platform frame 58 is preferably dimensioned so that it can nest relative to the floor frame 22 in order to maximize available trunk height for storage of articles on the platform 18. Additionally, the upstanding platform supports 24 and 26 are preferably slanted forward, that is in the direction of the rear wall in FIG. 1. Forward slanting is preferred to enable the invention to best fit inside an automobile trunk. Many trunks have a rear deck 69 that extends over a substantial portions of the trunk space and an internal structure, such as the spare tire, making forward slanting of the platform supports preferred. As an added benefit of forward slanting, the platform tends to simultaneously raise upwardly and rearwardly, making the platform very close to the trunk rear wall 100 when fully raised, allowing for easier loading and unloading of articles therefrom.

It should be noted that when structuring the invention for placement in a conventional automobile trunk, the preferred fully raised height of the platform is just above the rear wall 100 of the trunk, any additional height will only necessitate unnecessary additional lifting of an article onto the platform. The maximum lifting height of the platform is determined by the height of the upstanding platform supports less the length of the carriages. Generally, the upstanding platform supports are limited to a maximum length determined by the trunk depth since they cannot extend so long as to interfere with closure of a trunk lid 101. The carriages 44 and 46 must have a minimum length C in order that the lever arm thereby developed between the upper set of rollers 54 and the lower set of rollers 56 is sufficient to offset the anticipated lever arm developed by an article on the platform, as described above concerning the torques generated thereby.

In operation, when the user opens the car trunk lid, the platform should be at its lowest position along the upstanding platform supports, so that the platform frame is nesting within the floor frame. The user then pushes the electrical switch in a direction which causes actuation of the motor in a direction that causes the spool rod to rotate so as to wind the cables onto the spool rod. Because the cables are strung over the pulleys, as the cables wind they pull on the carriages lifting them along the upstanding platform supports. This movement is guided by interfering action between the carriage rollers and the flange on each of the upstanding platform supports. When the platform has reached the height of the trunk rear wall, the switch is deactuated. The platform will now stay in the raised position because the mechanical advantage of the worm drive of the motor acting through the gear ratio of the chain drive prevents the platform from slipping downward. When the user has placed an article, or several articles, on the platform, the switch is depressed in its opposite direction, reversing electrical voltage to the motor causing it to run in reverse. The spool rod then rotates oppositely causing the cables to unwind and lower the platform. The switch is then deactuated when the platform frame nests in the floor frame.

FIG. 4 shows an alternative embodiment of the invention in which a floor frame 72 is made size adjustable along its length D and width E, enabling the invention to be used in various sizes of automobile trunks. This is particularly important because the flat portion of the trunk floor, on which the floor frame is preferred to rest, may be smaller than the actual trunk width and length. Adjustability of floor frame size is accomplished by segmenting the floor frame 72 into four corner segments 74 and four connector segments 76. A plurality of regularly spaced holes 78 along the length of the connector segments 76 as well as the corner segments 74, provide for adjustability of the length of the floor frame along length D and width E. Specifically, the connector segments are telescoped in relation to the corner segments to achieve the desired dimensions and the holes 78 are then aligned so that a bolt 80 may be inserted therethrough. By this size adjustment procedure a floor frame may be assembled of custom size, as is shown in the figure.

It is clear to those skilled in the art than when the adjustable floor frame is adjusted to either increase or decrease the length D, the spacing of the upstanding platform supports will vary as well. Accordingly, the platform frame must be made adjustable to accommodate this change in spacing in the same manner as described for the floor frame, above.

FIG. 6 discloses how the spool rod may be made adjustable to accommodate length changes in the floor frame. The spool rod is segmented into two parts 75 and 77 which are connected together by a sleeve 79 and retained by setscrews 81. As the adjustable floor frame expands or contracts in response to size adjustment, the spool rod segments 75 and 77 are able to move axially inside the sleeve 79; when the adjustable floor frame is bolted together at a particular size setting, the setscrews 81 are tightened on the sleeve, thus, forming a rigid spool rod.

FIG. 5 shows an alternative embodiment of the invention which provides for a size adjustable platform 82. This allows for use of the invention in various sizes of automobile trunk spaces, as well as an accommodation for changes in upstanding platform support distance of separation caused by size adjustment of the adjustable floor frame. The platform is divided into four corner segments 84, 86, 88, and 90 each having a plurality of holes 92 running linearly in an orientation that is respectively perpendicular to the dashed lines 94, 96, where each corner segment overlaps the other. Because of the plurality of holes, arranged as shown in the figure, each corner segment may be telescoped over the other until the desired dimension is achieved, whereupon the holes on each are aligned and then fastened together by bolts 98. In this manner, the length F and width G of the platform 82 may be changed. The platform would generally be adjusted whenever the adjustable floor frame is varied in size.

An additional alternative embodiment of the invention is shown in FIGS. 7 and 8, where provision is made for horizontal reciprocable movement between the platform 18 and the platform frame 58. This is particularly useful to users who have trouble lifting objects with outstretched arms because the platform rollingly moves out over the rear wall 100 of the trunk 12. As shown in FIG. 7, conventional roller guides 102 are used wherein rollers 103 are rollingly guided in a C-shaped channel 104. In FIG. 7, the C-shaped channel is shown attached to the platform frame and the plurality of rollers are shown attached to the platform; however, it is possible to reverse these connections as the operational result is the same. A lever type lock 106 is provided on the platform frame to lock the platform in a desired location, thereby preventing the platform from sliding along the roller guides 102 during vehicle movement.

FIG. 8 illustrates an anti-tipping device. This anti-tipping device will prevent tipping when an article 16 is located on the platform 18 and the platform has been moved outwardly over the rear wall 100 causing the center of gravity of the invention plus the article to move near to or beyond the edge 108 of the floor frame 22 (as shown in FIG. 2). A stabilizer arm 110 is attached to each of the upstanding platform supports. Each stabilizer arm extends generally horizontally rearwardly from each of the respective upstanding platform supports, that is, in the direction of the passenger compartment in FIG. 1. Each stabilizer arm 110 is of sufficient length to extend underneath the rear deck 69 of the automobile, thereby preventing any possible tipping of the invention since interference between the stabilizer arms and the rear deck would then develop should tipping commence. To obtain this result, the stabilizer arms must make proximate contact with the rear deck. This necessitates, in turn, that the height of the stabilizer arms 110 be adjustable. This is achieved by providing each of the upstanding platform supports with a hole 112 which coincides with an elongated slot 114 in an extension member 116 connected to each of the stabilizer arms 110. Each extension member is slid in relation to the respective upstanding platform support until the respective stabilizer or anti-tipping arms mate with the underside of the rear deck. A bolt 117 is provided to secure the anti-tipping arm at the adjusted height.

Those skilled in the art to which this invention appertains will recognize that the above described preferred embodiment may be subject to change or modification. For instance, anti-friction slides can be used in place of the rollers 52. Such changes or modifications can be carried out without departing from the scope of the invention, which is intended to be limited only by the scope of the appended claims.

What is claimed is:

1. A lifting device for loading and unloading automobile trunks, comprising:

a floor frame;

a pair of platform supports attached to said floor frame, said pair of platform supports having a generally vertical orientation, said pair of platform supports being spaced apart in parallel relation to each other, each platform support of said pair of platform supports further having attached thereto a flange;

a pair of carriages, one carriage being reciprocably mounted to each said platform support, each carriage of said pair of carriages having attached thereto a plate, said plate having means mounted thereon for guiding said carriage along the flange of said platform support to which it is mounted;

a platform frame attached to said pair of carriages;

a platform mounted to said platform frame, said platform having a generally horizontal orientation; and means for reciprocally moving said pair of carriages along said pair of platform supports thereby causing said platform to raise and lower in relation to said trunk.

2. The lifting device of claim 1, wherein said means for guiding each said carriage is a plurality of rollers mounted on said plate and disposed on said plate so that at least one roller is located on one side of said flange and at least two rollers in a mutually spaced apart relationship along said flange are located on the other side of said flange.

3. The lifting device of claim 2, wherein four rollers are mounted to said plate in a rectilinear pattern in which each of said rollers is located at a corner of said rectilinear pattern, two of said rollers being located on each side of said flange, said two rollers on said each side of said flange being in a mutually spaced apart relationship.

4. The lifting device of claim 1, wherein said pair of platform supports are oriented relative to said floor frame for facilitating placement of said lifting device in said automobile trunk.

5. The lifting device of claim 1, wherein said moving means for reciprocally moving said pair of carriages comprises a pair of pulleys, one pulley mounted to each said platform support; a spool rod mounted to said pair of platform supports; a pair of cables, one cable for each said platform support, each said cable of said pair of cables being strung on each said platform support, respectively, from said carriage, over said pulley then wound onto said spool rod; and electric motor means for rotating said spool rod in order to wind and unwind said cable on said spool rod thereby causing said platform to raise and lower.

6. The lifting device of claim 5, wherein said electric motor means includes an electric motor actuated by electrical power from said automobile, an actuation switch for actuating said power to said electric motor; and a chain drive between said electric motor and said spool rod for causing said spool rod to rotate in response to actuation of said electric motor.

7. A lifting device for loading and unloading automobile trunks, comprising:

a floor frame;

a pair of platform supports attached to said floor frame, said pair of platform supports having a generally vertical orientation, said pair of platform supports being spaced apart in parallel relation to each other, each platform support of said pair of platform supports further having attached thereto a flange;

a pair of carriages, one carriage being rollingly mounted to each said platform support, each carriage of said pair of carriages having attached thereto a plate, said plate having a plurality of rollers mounted thereon for guiding said carriage along the flange of said platform support to which it is mounted;

a platform frame attached to said pair of carriages;

a platform mounted to said platform frame, said platform having a generally horizontal orientation; and means for reciprocally moving said pair of carriages along said pair of platform supports, said means for reciprocally moving comprising a pair of pulleys, one pulley mounted to each said platform support; a spool rod mounted to said pair of platform supports; a pair of cables, one cable for each said platform support, each said cable of said pair of cables being strung on each said platform support, respectively, from said carriage, over said pulley then wound onto said spool rod; and electric motor means for rotating said spool rod in order to wind and unwind said cable on said spool rod thereby causing said platform to raise and lower.

8. The lifting device of claim 7, wherein said plurality of rollers mounted on said plate are disposed on said plate so that at least one roller is located on one side of said flange and at least two rollers in a mutually spaced apart relationship along said flange are located on the other side of said flange.

9. The lifting device of claim 8, wherein four rollers are mounted to said plate in a rectilinear pattern in which each of said rollers is located at a corner of said rectilinear pattern, two of said rollers being located on each side of said flange, said two rollers on said each side of said flange being in a mutually spaced apart relationship.

10. The lifting device of claim 7, wherein said pair of platform supports are oriented relative to said floor frame for facilitating placement of said lifting device in said automobile trunk.

11. The lifting device of claim 7, wherein said electric motor means includes an electric motor actuated by electrical power from said automobile; an actuation switch for actuating said power to said electric motor; and a chain drive between said electric motor and said spool rod causing said spool rod to rotate in response to actuation of said electric motor.

12. The lifting device of claim 7, wherein said floor frame, said platform frame, and said platform are size adjustable.

13. The lifting device of claim 12, wherein said size adjustable floor frame is comprised of four corner segments, said corner segments being telescopically joined together to form a floor frame by removable fastening means; said size adjustable platform frame being comprised of four corner segments, said corner segments being telescopically joined together to form a platform frame by removable fastening means; and said size adjustable platform being comprised of four segments, said segments being in mutually overlapping relation and joined together by removable fastening means.

14. The lifting device of claim 7, wherein said platform is mounted to said platform by movement means for moving said platform in parallel relation relative to said platform frame.

15. The lifting device of claim 14, further comprising anti-tipping means, said anti-tipping means comprising at least one stabilizer arm attached to said lifting device, said stabilizer arm further being in an interfering relationship with respect to said automobile trunk to prevent said lifting device from tipping when said platform is moved to a position remote in relation to said platform frame.

16. The lifting device of claim 15, wherein said movement means comprises a C-shaped channel attached to one of said platform frame and said platform and rollers attached to the other of said platform frame and said platform, said rollers being rollingly supported inside said C-shaped channel, said movement means further comprising a lock member for holding said platform in fixed relation relative to said platform frame.

17. A lifting device for automobile trunks, comprising:
   a size adjustable floor frame;
   a pair of platform supports attached to said size adjustable floor frame, said pair of platform supports having a generally vertical orientation, said pair of platform supports being spaced apart in parallel relation to each other, each of said pair of platform support further having a flange attached thereto;
   a pair of carriages, one of said pair of carriages being rollingly mounted to each said platform support, each carriage of said pair of carriages having attached thereto a plate, said plate having a plurality of rollers mounted thereon, said rollers being disposed on said plate so that at least one roller is located on one side of the flange of said platform support to which said carriage is mounted and at least two rollers in mutually spaced apart relation along said flange are located on the other side of said flange;
   a size adjustable platform frame attached to said pair of carriages;
   a size adjustable platform movably mounted by movable mounting means to said size adjustable platform frame, said size adjustable platform having a generally horizontal orientation, said movable mounting means permitting said size adjustable platform to move in a parallel relationship with respect to said size adjustable platform frame;
   anti-tipping means for preventing said lifting device from tipping when said size adjustable platform is moved to a position remote in relation to said size adjustable platform frame; and
   means for reciprocally moving said pair of carriages along said pair of platform supports, said means for reciprocally moving comprising a pair of pulleys, one pulley mounted to each said platform support; a spool rod mounted to said pair of platform supports; a pair of cables, one cable for each said platform support, each said cable of said pair of cables being strung on each said platform support, respectively, from said carriage over said pulley and wound onto said spool rod; and electric motor means for rotating said spool rod in order to wind and unwind said cable on said spool rod thereby causing said size adjustable platform to raise and lower.

* * * * *

UNITED STATES PATENT AND TRADEMARK OFFICE
CERTIFICATE OF CORRECTION

PATENT NO. : 4,799,849
DATED : January 24, 1988
INVENTOR(S) : Donald L. Miller

It is certified that error appears in the above-identified patent and that said Letters Patent is hereby corrected as shown below:

Column 1, line 28, after "2,953,287", insert ---- to ----.

Column 4, line 41, delete "portions", insert ---- portion ----.

In The Claims

Column 9, line 12, after "in", insert ---- a ----.

Column 9, line 13, delete "relation", insert ---- relationship ----.

Column 8, line 63, after "platform" insert ---- frame ----.

Signed and Sealed this

Eighth Day of August, 1989

*Attest:*

DONALD J. QUIGG

*Attesting Officer*      *Commissioner of Patents and Trademarks*